United States Patent [19]

Carrera et al.

[11] Patent Number: 4,585,044
[45] Date of Patent: Apr. 29, 1986

[54] TUBULAR TIRE FOR CYCLES

[75] Inventors: Cesare Carrera, Milan; Giuseppe Formenti, Motta Visconti, both of Italy

[73] Assignee: Pneumatici Clement S.p.A., Milan, Italy

[21] Appl. No.: 451,746

[22] Filed: Dec. 21, 1982

[30] Foreign Application Priority Data

Dec. 23, 1981 [IT] Italy ................... 25806 A/81
May 28, 1982 [IT] Italy ................... 21557 A/82

[51] Int. Cl.$^4$ .................. B60C 5/00; B60C 3/02
[52] U.S. Cl. ........................ 152/165; 152/209 R;
 152/453; 152/454; 152/511; 152/530; 152/549;
 152/559; 152/563; 156/118; 156/121; 156/122;
 264/326
[58] Field of Search ............... 152/165, 347, 349, 348,
 152/155, 151, 351, 352 R, 353 R, 353 C, 354 R,
 356 R, 354 R, 358, 359, 360, 361 R, 363, 364,
 374, 209 R, 453, 454, 504, 506, 500, 502, 508,
 510, 511, 526, 530, 563, 548–550, 558–559;
 156/118, 121, 122; 264/326

[56] References Cited

U.S. PATENT DOCUMENTS

| 671,365 | 4/1901 | Beck | 152/352 |
|---|---|---|---|
| 684,050 | 10/1901 | Falconnet et al. | 152/347 X |
| 1,355,986 | 10/1920 | Lister | 152/165 X |
| 1,913,422 | 6/1933 | Wikle | 156/121 |

*Primary Examiner*—Edward Kimlin
*Assistant Examiner*—Thomas Bokan

[57] ABSTRACT

A tubular tire for cycles comprising a tubular toroidal body including an inner airtight tube to be inflated, the tire body or carcass being equipped, on the outer surface mating the wheel rim, with a rubberized tape having projecting portions such as profiles or prominences adapted to ensure a better engagement between the tire and the rim.

The carcass is built by longitudinally joining together the edges of a rubberized fabric, the junction being radially external with respect to the tire and below the tread. The edges are joined either by overlapping or by abutment of the edges. In this latter case a reinforcement strip is provided between the carcass and the tread. An additional narrow strip protecting the junction is provided between the carcass and the inner or air tube.

According to an embodiment the tire has a tunnel shaped cross-section obtained by suitably shaping the rubberized tape and the tire body when vulcanizing the tire.

The tubular tire can further be provided with an additional band of gummy material forming a cordonnet having two side pseudobeads for the engagement of the tire with conventional wheel rims.

The tire body is built from an endless band of a rubberized textile material being either a cross-biased ply structure or a square woven fabric. In the latter case the endless band provides for a limited overlapping of the ends of an open band that is covered by a strip of the same fabric so that the untruncated threads of the strip are parallel to the band threads that have been cut in order to maintain a mechanical continuity of the toroidal carcass. The invention relates also to the improved methods for manufacturing such tubular tires.

12 Claims, 19 Drawing Figures

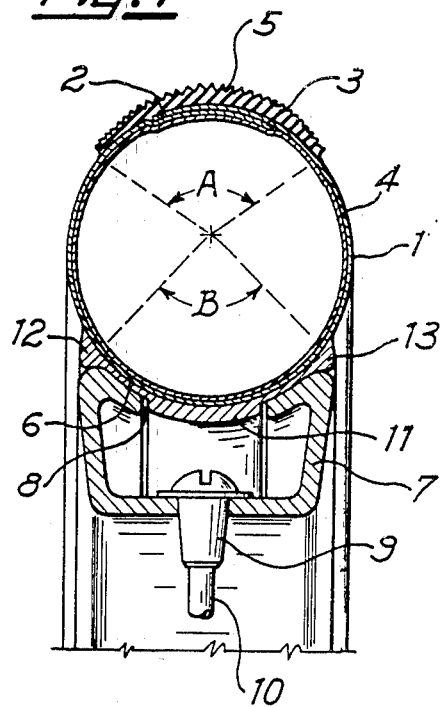
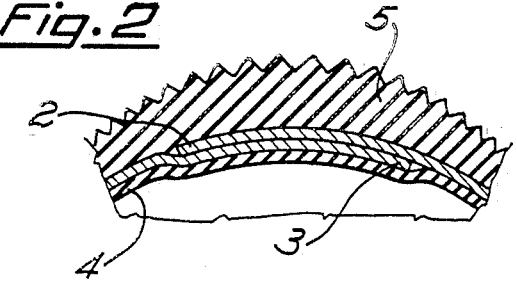
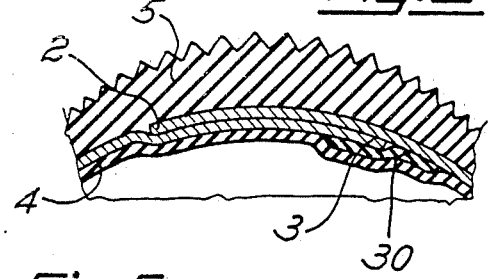
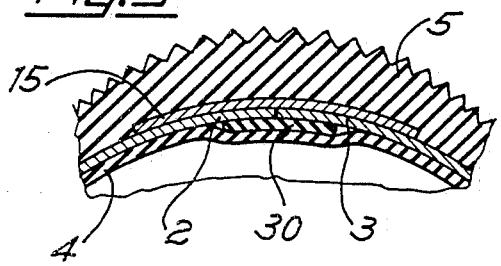
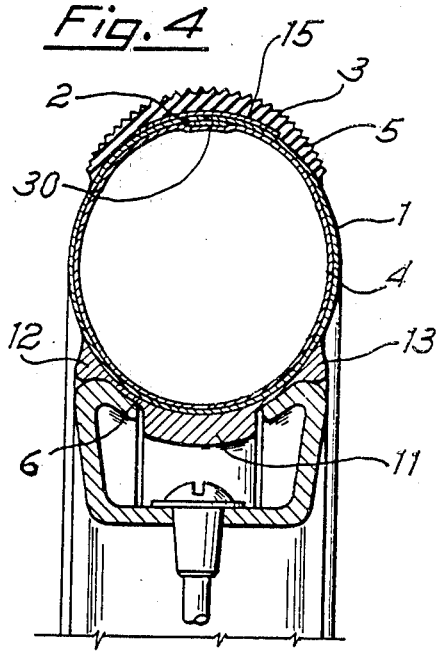
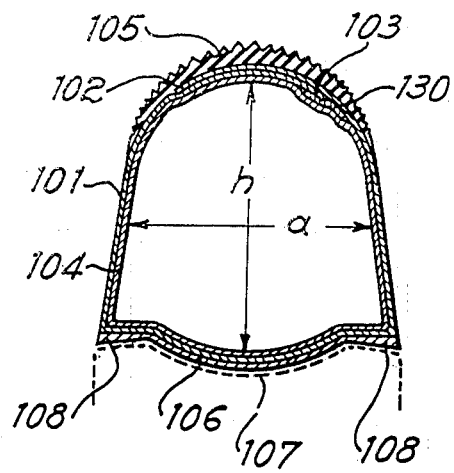

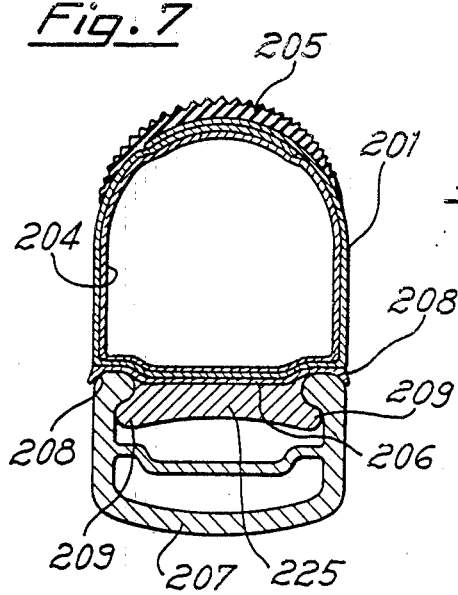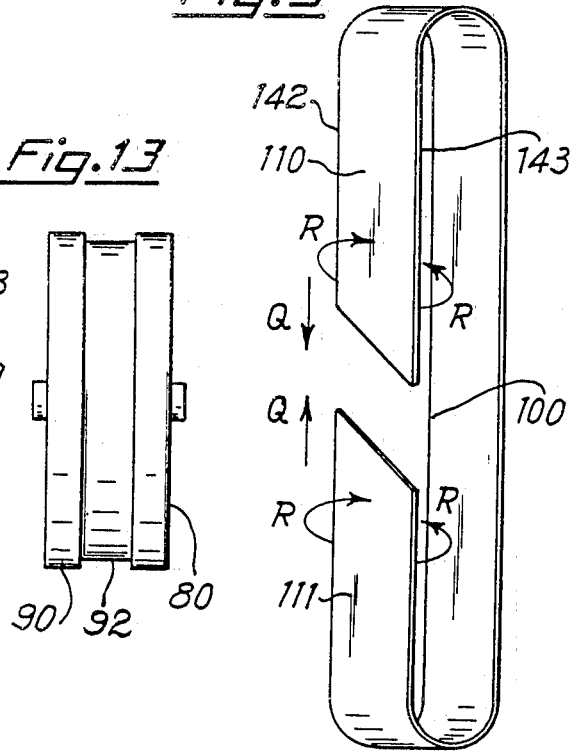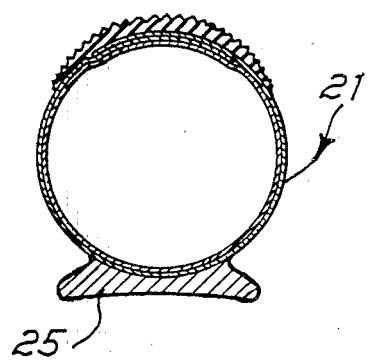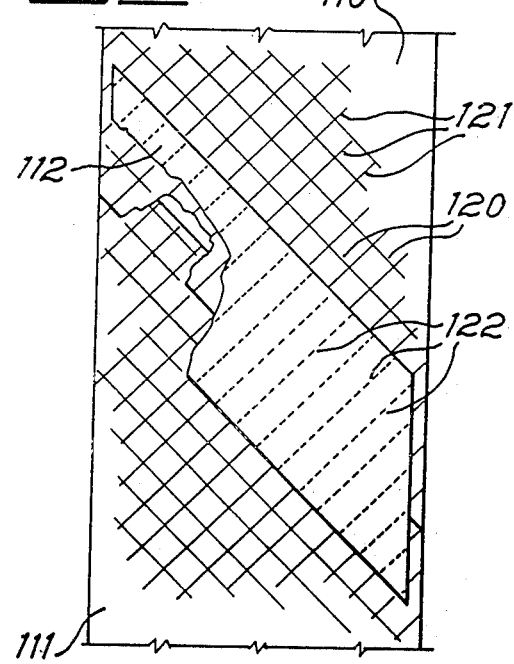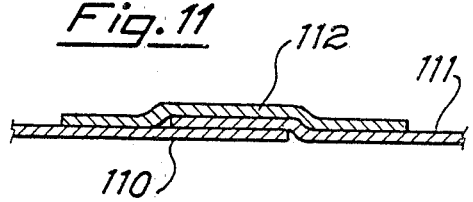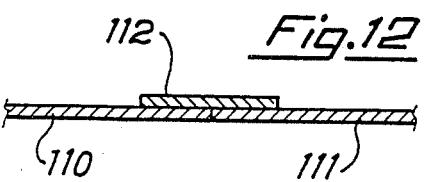

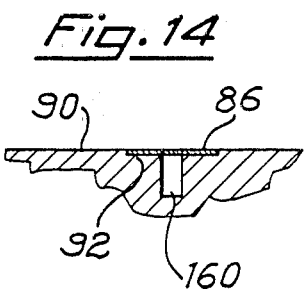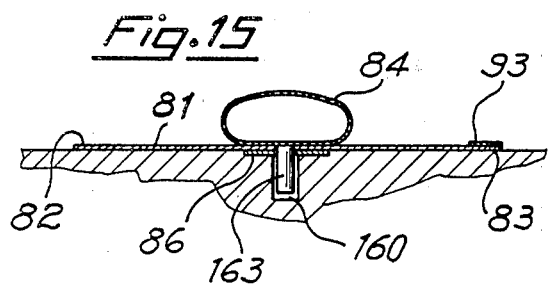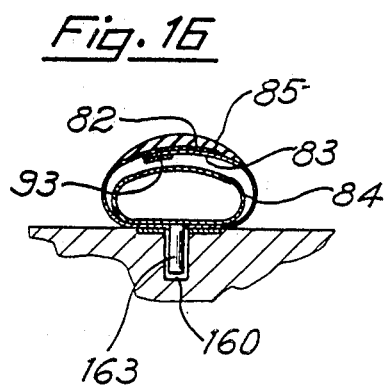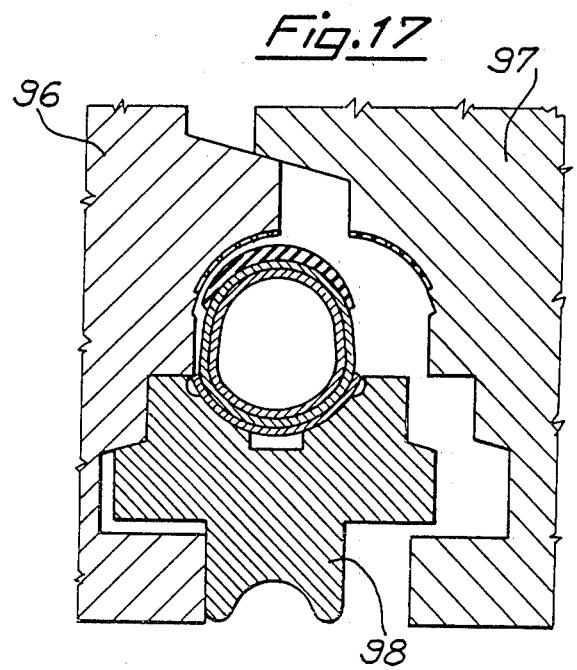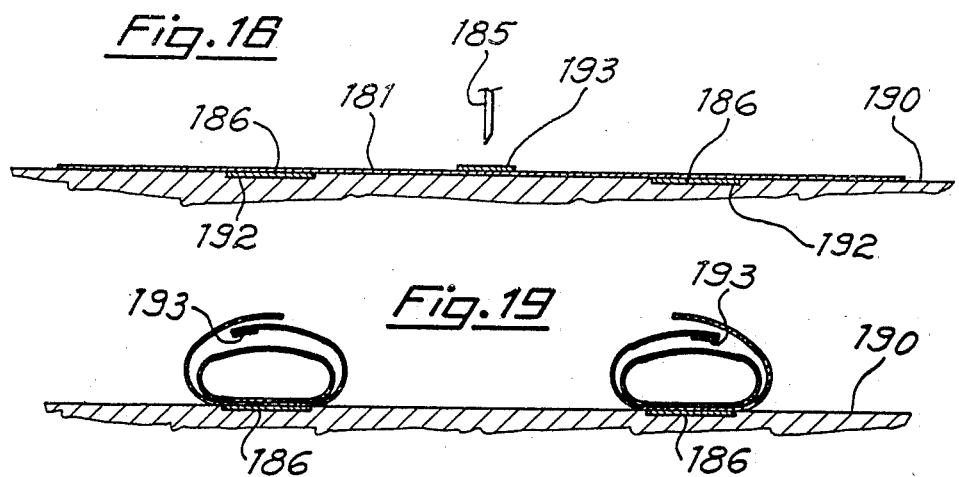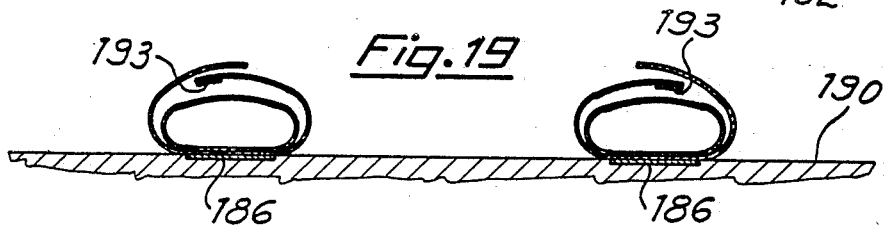

TUBULAR TIRE FOR CYCLES

BACKGROUND OF THE INVENTION

The present invention relates to tubular tires for cycles and more particularly to those tires wherein the tire body is wholly and irremovably enclosed to form a toroidal ring and lacking of beads. Such tires, that are commonly known as tubular tires, are mounted on special wheel rims, that is without the flanges provided on the conventional wheel rims to engage the beads of a normal tire having an inflatable inner tube that is separable from the tire body upon dismounting the tire from the rim. The invention relates to improved tires of the above mentioned type as well as, in a particular embodiment, to an enclosed tubular tire without an independent air tube that is anyhow provided with a sort of "beads" that make possible the mounting onto a conventional wheel rim. Finally the invention relates to a method for manufacturing such tires.

Tubular tires are mainly intended for the agonistic use thanks to their lightweight, minimum power absorption due to hysteresis, flexibility and high speed of elastic response. As a drawback these tires have some negative features since they are more expensive, laborious to be employed and difficult to be repaired when punctured. Namely the tires are built from a tire body or carcass formed by one or more bands of rubberized fabric having the hems joined together to form a closed toroidal structure. An inner or air tube is placed within the carcass and a rubber tread band is applied onto the radially outer surface. Upon vulcanizing the rubber band forms the outer tread whereas the inner tube is intimately bound to the body. According to the prior art that provides both for a sewing and for an overlapping junction of the edges (by glueing and/or vulcanizing) the junction area is placed on the inner circumference of the tire, i.e. the part that is to contact the wheel rim and is possibly protected by a reinforcement strip running along the full inner circumference of the tubular tire, see for example French Pat. No. 2,347,216. The junction is always located in correspondence of the minimum diameter of the toroidal ring so that, for example, this latter can be unsewn to expose the inner tube when a repair is needed.

Beyond the repair, also the installation of the tire is rather laborious since the assembly wheel rim-tubular tire requires a glueing of the members by means of a special putty to avoid that the tire and the rim get detached when in use. The presence of putty is a further obstacle when dismounting the tire for repair, and under particular stresses the putty does not ensure that the tire cannot move with respect to the rim, both longitudinally and transversely and detach from this latter with consequences that are easy to realize.

SUMMARY OF THE INVENTION

It is an object of the present invention to provide an improved tubular tire for cycles that overcomes the above shortcomings, and particularly that provides for a junction of the edges on the radially outer surface of the tire, i.e. below the tire tread so that the increased resistance makes less likely the event of a puncture and on the other hand it is always possible to repair the tubular tire by injecting a self-sealing and vulcanizing composition into the tire (e.g. through the valve).

It is another object of the present invention to provide a tubular tire of the above type having an improved resistance to the side stresses when in use, thanks to the presence of a narrow protection strip between the air tube and the junction of the carcass.

It is still an object of the invention to provide a tubular tire having an improved cross-section, particularly a tunnel cross-section, for better performances for the rider's comfort and the inflating pressure.

Another object of the invention is to provide a tubular tire of the above type wherein the rubberized tape for the engagement with the wheel rim is equipped with two continuous side profiles and with a plurality of projections adapted to prevent any undesired displacement, both longitudinally and laterally.

Still another object of the invention is to provide a carcass or tire body from a single fabric that is particularly resistant to longitudinal stresses.

Another object of the invention is to provide a tubular tire having an additional gummy profile on the surface facing the wheel rim in order to allow for the use of this kind of tubular tire even with conventional wheel rims provided with bead flanges, thanks to the presence of fictitious beads formed when vulcanizing this additional strip in a mould. Thus a tire having very good characteristics, such as those for agonistic employ, can be mounted onto a conventional wheel rim that is cheaper without the drawbacks stated above for the firmness of the mounting, the use of putty, etc.

It is still an object of the invention to provide a method for manufacturing such tubular tires in an easy and cheap way, particularly for the assembly and forming operations.

BRIEF DESCRIPTION OF THE DRAWINGS

Some preferred embodiments both of the tire and of the manufacturing method will now be disclosed with reference to the attached drawings in which:

FIGS. 1 to 5 and 8 show some embodiments of the tubular tire according to the invention;

FIGS. 6 and 7 show a tunnel cross-section tubular tire, respectively for the use on special and conventional wheel rims;

FIGS. 9 to 12 illustrate the preparation of the endless band of single fabric that will form the carcass;

FIGS. 13 to 17 illustrate the method for manufacturing the tire of the invention; and FIGS. 18 and 19 show a modified method.

DESCRIPTION OF THE PREFERRED EMBODIMENTS

Referring now to FIG. 1 and to the enlarged detail shown in FIG. 2, the tire comprises a body or carcass 1 built from at least one rubberized fabric including cords or threads, usually textile, but recently also metal strings or other fibers have been used. Such fabric can be either a single square woven fabric having weft and warp threads or a double fabric known as "tyre cord" fabric having embedded parallel cords that are inclined with respect to the circumferential extension of the tire as will be better shown later. The opposite side edges 2 and 3 of the tire body have been overlapped outward to form a closed toroidal tubular element or tire carcass wherein the edges are joined together at a radially external position.

Within the carcass there is placed an inner tube 4, of an elastomeric material forming the air tube that is preferably introduced already vulcanized. The inner tube is usually of an air-tight butyl rubber or latex keeping the inflating pressure constant and is equipped with an outward projecting valve for inflating the tire (not shown for simplicity). Air tube 4 that is intimately bound to the body 1 in the final tubular tire can even be formed according to other known techniques, e.g. by a solution or a latex or a calendered sheet applied onto the tire body.

On the outer surface of the tire body, in a position that is radially outward, there is applied a tread 5 that is centered about the diametral plane of the tire and generally extends for an arc A of about 90°, but such as to cover all the overlapped area of edges 2, 3. At a position opposite to that of tread 5, i.e. on the inner circumference of the body 1 adjacent wheel rim 7, there is provided a rubberized fabric tape 6 centered about the diametral plane, and extending for an arc B not smaller that 60° and such as to cover all the tire surface facing wheel rim 7. According to the invention tape 6 exhibits a first line of projections, i.e. relief elements, 11 suitably having a cylindrical shape and bound to engage with holes 8 provided on the wheel rim for tightening the nuts (also called nipples) 9 fastening spokes 10 of the cycle wheel. Tape 6 further provides for two additional continuous profiles 12 and 13 at the side edges.

As it is clear from FIG. 1, the projections and profiles are shaped so as to maintain the continuity of the contact between the tubular surface and the wheel rim surface also at the area wherein these two surfaces progressively depart from each other, and more particularly so as to cover all the supporting portion of the wheel rim. Profiles 12 and 13 are provided in correspondence of those side portions of the tire that in the conventional tires were already lacking of engagement portions and were susceptible of side swinging with respect to the wheel rim.

It will be clear that projections 11 prevent any possible shifting along the longitudinal and lateral directions. Even profiles 12 and 13 can be formed, if desired, as a plurality of spaced reliefs like projections 11.

Preferably tape 6 is formed by a strip of cord fabric having the embedded threads or cords parallel to the circumferential direction of the tire and that is exceedingly rubberized with respect to the mere protection of the threads, so that the projections and profiles 11, 12 and 13 are formed by moulding in the vulcanization step. Suitable materials for tape 6 are a tyre cord fabric having cords inclined to the longitudinal direction, or a square woven fabric or even a simple rubber composition without any reinforcing threads or fibers provided that the hardness, modulus of elasticity and hysteretic loss are the proper ones.

A modified embodiment of the invention is shown in FIGS. 4 and 5, wherein edges 2 and 3 are joined by abutment, that is the edges are only drawn near without overlapping. In such a case, along the entire circumferential extension of the junction a strip 15 of rubberized fabric is provided overlaying the adjacent edges, this strip being interposed between the tire body and tread 5. This strip reinforces the junction between the edges and extends for a narrower angular portion than tread 5, but is rather extended. The tubular tire shown in FIG. 4 is otherwise identical to that of FIGS. 1 and 2, the only difference being that projections 11 are higher as shown in the Figure.

Another embodiment of the invention is illustrated with reference to FIG. 3. When the edges have been joined together by overlapping, the step that is unavoidably formed by the inner edge can damage the air tube below after a prolonged use. More precisely this step is a discontinuity that might damage the air tube due to the deformation movements of the tire in use. To prevent this inconvenience there is provided a narrow strip 30 of gummy material covering the border of the inner edge (3 in FIG. 3) and tapering to the inner surface of the tire body. This narrow strip is shown spread out in FIG. 3 although originally it is a narrow list having a constant rectangular cross-section. When assemblying the tire this list is deposited on that carcass edge to be surmounted by the other one. In the mould, under the combined actions of the pressure admitted into the inner tube, of the mould shape and of the vulcanization process, the list spread over the junction assumes a squashed shape as can be seen in the Figure.

This tapering strip can be likewise employed in the tubular tire of FIG. 4 wherein edges 2 and 3 are abutting (see FIG. 5), in order to avoid that a faulty junction of the edges produces slits or cracks within which the air tube will be worn out after a prolonged use.

Another embodiment of the tubular tire of the invention is shown in FIG. 6. It comprises a carcass or tire body 101 of a rubberized fabric within which an air tube 104 is housed and adheres to the inner wall of the tire body after vulcanizing and/or glueing. The tire body is preferably formed from an open band 100 of square woven fabric (shown in FIG. 9) joining the ends 110 and 111 in a way that will be described later. Then the side edges 142, 143 of the endless band are wrapped around the air tube and overlapped in proximity of tread 105 that realizes the protective covering of the junction. According to this embodiment the excess of gummy material of tape 106 engaging the wheel rim is even greater if compared with the preceeding embodiments. Edges 102, 103 are overlapped and joined together, the material forming tread 105 is applied over the junction and the tire is vulcanized in a mould. The lower portion of the mould is shaped so as to reproduce rather exactly the cross-section of the wheel rim. More precisely it provides a central swell and two side portions that are substantially flat (i.e. not curved) and slightly tilted. The remainder of the mould is also shaped in such a way to define a cavity having a cross-section resembling that of a road tunnel. When the mould is closed and the tire is vulcanized admitting a pressure of fluid into the air tube and raising the mould temperature, tape 106 is vulcanized as well as the remainder of the tire and the tire assumes the shape imposed by the mould and shown in FIG. 6. This shape includes a central concave portion and two side bands 108 substantially flat and slightly tilted to the horizontal in order to better fit the wheel rim 107 (shown with dashed lines). Of course the tire body 101 and the air tube 104 bonded together also assume this particular profile so that the tire exhibits the peculiar tunnel cross-section shown in the Figure. This tubular tire according to the invention has therefore a cross-section that is not generally circular and a lower portion properly fitting the rim section without an appreciable increase of the wall thickness (as compared with the preceeding embodiments having at least locally a considerable thickness). In FIG. 6 the tire is shown as it appears before being inflated whereas once being inflated at the right pressure, side tabs 108 are less tilted to the horizontal. The height h of the air cushion is appreciably greater than the lateral width a (as measured at the center of gravity) of the tire. This way the bending radius in correspondence of the tread can be reduced without decreasing the overall volume of the tire. Experimentally a preferable value of the ratio h/a was found comprised between 1.1 and 1.2 but other values of this ratio in the range 1.1.1.4, are allowable particularly for a better fitting between the tubular tire and the wheel rim. According to another embodiment shown in FIGS. 7 and 8 the tubular tire of the invention can be modified in order to be directly mounted on conventional wheel rims; i.e. rims that are equipped with bead seats or flanges and usually employed together with open tire bodies having an independent air tube. The advantage of this embodiment is that the user can employ a very good tubular tire without being compelled to buy the special and more expensive rims adapted for tubular tires. More important, he can avoid the use of putty when mounting the tire and the laborious operations in case the same is to be replaced.

In FIG. 7 corresponding references have been used to indicate the components corresponding to those of FIG. 6. The tire comprises a body or carcass 201 enclosing an air tube 204 and is provided with a tread 205 as well with a rubberized tape 206. In order to get a tubular tire that can be mounted on a conventional rim 207, having bead flanges for engaging an open tire body, the inward surface of the tire includes an additional profile formed by a rubberized thick list 225 laterally expanding to form continuous tabs 209 that performs a function similar to that of the beads for engaging the rim. Profiles of thick list 225 are built by applying either an additional rubberized tape of fabric or an excess of rubber layer before vulcanizing in the mould and employing a suitably shaped mould in order to obtain the desired cross-section. The tire is mounted not inflated on the rim so that the engagement of the pseudeo-beads 209 with the rim flanges is made easier and no tool is required since the profiles do not include the metal cords usually present in the true beads of an open tire body: this allows for a mounting by hand. After completing the operation the tire is inflated and firmly abuts against the rim ensuring the best adherence.

FIG. 8 shows a tubular tire 21 having a cross-section generally circular provided with pseudo-beads 25 forming another embodiment of the invention that will not be described with further details.

With reference now to FIGS. 9 to 12 there is illustrated the junction of ends 110,111 and an open band of a single fabric having weft and warp threads and known as square woven fabric. This fabric can be used to build the tire body of anyone of the tubular tires already described. In FIG. 9 the open band is shown before the joining of the end portions 110 and 111 that have been cut along lines inclined by about 45° with respect to the longitudinal axis, this cut being parallel to cords 120 and truncating cords 121 that are orthogonal to the former as can be seen in FIG. 10. After the junction indicated by arrows QQ has been accomplished, the endless band is wrapped longitudinally as shown by arrows R to form the carcass, ends 110, 111 are slightly overlapped and a list 112 of rubberized fabric having cords 122 aligned with those 121 that have been cut is applied. This way, after vulcanizing one obtains a tire having very good characteristics of longitudinal resistance and not subject to longitudinal sliding of the joined parts. The tubular tire so built has a single fabric carcass and therefore is very strong although lightweight and not too stiff. This implies a reduction of the used material and therefore an appreciable reduction of cost and weight as well as a better flexibility of the sides. Of course the tubular tires already disclosed and falling within the scope of the invention can be built also with two conventional crossed fabrics and sharing the advantages and improvements illustrated of the tunnel cross-section. FIGS. 10 and 11 show details of the junction for the square woven fabric whereas according to a further embodiment schematically shown in FIG. 12, the junction between ends 110, 111 is obtained by abutment of the borders and applying a covering list 112.

The method for manufacturing the tubular tires of the invention will now be described with reference to FIGS. 13 to 19. FIG. 13 schematically shows a cylindrical drum 80 for assembling the components that will form the tubular tire after vulcanization. On the outer surface 90 of the drum there is provided a seat or groove 92 over which there is positioned a rubberized tape 86 corresponding to the shaped tapes 6, 106, 206 of the various embodiments (FIG. 14).

Thereafter, and with reference to FIG. 15, the open band 81 of square woven or double crossed fabric is laid over the drum and the ends are joined according to the methods illustrated with reference to FIGS. 9 to 12. Then a gummy narrow strip 93 is applied at one of the edges, e.g. edge 83 in FIG. 15, to form protecting strip 30 already illustrated. The air tube 84 is then positioned onto the drum, such tube being either an already closed and vulcanized tube or an open leaf or a composition according to known techniques, and then edges 82, 83 are joined together. A hole 160 in the drum is provided for housing the valve 163 of the air tube passing through a hole drilled in the materials. FIG. 16 shows how edge 83 of the tire body is folded first around the air tube and then edge 82 is folded above the former. Thereafter a composition that will form tread 85 is applied and the tubular tire is ready for the vulcanization wherein the parts are joined together thanks to adherence, sticking or adhesives. For sake of simplicity the process to form a tubular tire having abutting edges will not be shown, being clear that in such a case, starting from the arrangement of FIG. 15, the change consists in that edges 82, 83 will be positioned side by side and a strip of rubberized fabric (i.e. list 15 of FIG. 5) will be laid over the junction before applying composition 105 that will form the tread. For the tubular tires illustrated in FIGS. 7 and 8 an additional layer of gummy (or rubberized) material will be placed into groove 92. As an alternative this material can be directly applied onto the shaping ring described in the following.

The tubular tire so assembled is now taken away from the drum and mounted onto a rigid metal ring 98 forming a movable and interchangeable member of the vulcanizing mould. The tubular tire mounted over such metal ring is then partially inflated for a correct positioning and for avoiding any deformation or displacement at the closure of the mould. This correct positioning is very important to obtain a perfect moulding of the tire that means high quality of the final product.

The metal ring so prepared is mounted on a vulcanization press comprising two further moulding portions, i.e. half moulds 96 and 97. These half moulds have annular shape, are reciprocally movable and provided with a surface profile such as to form a closed cavity adapted to contain the tubular tire after the mould has been closed. The mould and the metal ring shown in FIG. 17 are adapted for manufacturing a tubular tire such as the ones shown in FIGS. 1 and 4, but it is to be understood that also the tubular tires illustrated in FIGS. 6, 7 and 8 can be built according to the method of the invention by replacing the ring and the mould. Then the tubular tire is vulcanized in a known way by admitting a suitable vulcanizing fluid into the air tube and raising the temperature.

FIGS. 18 and 19 schematically illustrate an improved method that increases the manufacturing rate and makes it easier. The cylindrical drum has a double width and provides for two grooves 192 for housing rubberized tapes 186. Then fabric 181 (also of double width) is positioned over the drum and a strip of rubber material 193 is placed along the middle of the carcass fabric.

A knife 185 simultaneously cuts the rubber strip and the carcass fabric and the half strips remain attached to the carcass edges. The manufacturing goes on as in the already illustrated method, by applying the air tubes, folding the carcass edges, etc. It has been found that it is not strictly necessary that the protective strip 193 is exactly placed astride the edge of the tire fabric since upon vulcanizing the strip is deformed and laterally squashed so as to cover the step formed by the inner edge. For this reason also in FIGS. 15 and 16 the edge of strip 93 has been shown as aligned with edge 83 of the carcass fabric.

The tubular tire of the invention provides for several and important advantages both for the manufacturer and the user. Namely, as already stated, the particular shape of rubberized tape 6 in the tubular tires of FIGS. 1 and 4 avoid or reduce the use of putty for fastening the tire to the wheel rim since experimental tests proved that projections 11, by plugging into correspondent holes 8 of the rim, prevent any relative rotation between the rim and the tire, thereby protecting the integrity of the inflating valve and improving the elastic response when accelerating or braking. Moreover projections 11, cooperating with profiles 12 and 13 almost completely prevent the rotation movements of the tubular tire with respect to the rim in a plane such as the one of the cross-sections of FIGS. 1 and 4. The tests showed a very good side stability of the tire that prevents any accidental detachment from the rim in the use.

Similar results holds for the tunnel shaped tire of FIG. 6 together with characteristics of better comfort. Employing a tubular tire of this type it is possible to reduce the surface area contacting the ground (thus reducing the friction) without reducing the volume of the air cushion interposed between the tread and the wheel rim.

Finally the tubular tires of FIGS. 7 and 8 adds the possibility of mounting a tire for agonistic use (with improved characteristics) onto a conventional cheaper wheel rim in a very simple manner.

The use of a square woven fabric to build the carcass reduces the costs and the weight for the tubular tire without altering the other features.

As for the manufacturing methods, they are quite easy to be carried out in spite of the several improvements conferred to the tires.

Although the invention has been disclosed with reference to some particular and preferred embodiments both of the tire and of the method, the same is not limited to these and the scope of the invention extends to the obvious changes and/or modifications that provide for a tubular tire for cycles wherein the junction of the edges is provided under the tread belt and the surface facing the wheel rim is suitably shaped for a better engagement.

What we claim is:

1. A tubular tire for cycles comprising a tire body formed by at least one band of rubberized fabric including reinforcement threads, the side eddges of said band being longitudinally joined together to form a carcass or tubular element, a toroidal inner tube of an elastomeric material wholly and irremovably enclosed thereinto adapted to provide an air tube for inflating the tire, and a tread disposed on the outer circumference of said tire body, the tubular tire being characterized in that the junction of said edges is accomplished at a position that is radially outward under the tire tread, said tire tread being placed in correspondence of said junction and that a rubberized tape having a plurality of circumferential projections is provided on the inner circumference of the tire facing the wheel rim for the engagement with said wheel rim.

2. A tubular tire as claimed in claim 1 characterized in that a protective strip of gummy material is inserted between said carcass and said tread belt in correspondence of the longitudinal junction of the edges.

3. A tubular tire as claimed in claim 2 characterized in that it provides for an additional thick list of gummy material applied over said rubberized tape and forming two side profiles or fictitious beads for the engagement with a wheel rim of the type used with an open tire having side beads and a separate air tube.

4. A tubular tire as claimed in claims 2 or 3 characterized in that the tire body is formed by a conventional fabric having a cross-biased ply structure.

5. A tubular tire as claimed in claims 2 or 3 characterized in that the carcass is built from an open band of single fabric having weft and warp threads (square woven fabric) joined at the ends by means of a limited overlapping, said fabric band being cut along an angle of about 45°, and that the junction is covered by an additional strip of fabric having threads aligned with those threads of the band that are truncated at the ends.

6. A tubular tire as claimed in claim 1, characterized in that the junction of said edges is obtained by overlapping the edges.

7. A tubular tire as claimed in claim 6, characterized in that said edges are overlapped along the entire junction and the overlapping area is completely covered by said tread belt.

8. A tubular tire as claimed in claim 1, characterized in that the junction of said edges is obtained by abutment of the edges.

9. A tubular tire as claimed in claim 8, characterized in that a strip of rubberized fabric is inserted in correspondence of said abutment between the tire body and the tread belt.

10. A tubular tire as claimed in claim 6 or claim 8, characterized in that said rubberized tape is shaped to form a central concave area and two side tabs substantially flat, the side tabs forming an angle less than 90° with the side walls of the tire, the cross-section of the tubular tire being tunnel shaped wherein the ratio between the maximum inner height of the air tube and the average width as measured at the center of gravity is comprised between 1.1 and 1.4.

11. A tubular tire for cycles comprising: a tire body having side walls and being formed by at least one band of rubberized fabric including reinforcement threads, the side edges of said band being longitudinally joined together to form carcass or tubular element, a toroidal inner tube of an elastomeric material wholly and irremovably enclosed thereinto and adapted to provide an air tube for inflating the tire, and tread disposed on the radial outer circumference of said tire body, the tubular tire being characterized in that the cross-section of said tubular tire is tunnel-shaped, the junction of the edges of the tire body being located radially external with respect to the tire body and under the tire tread, the lower portion of said tire body being shaped to form a central area which is concave with respect to a wheel rim and said lower portion having two side tabs that are substantially flat and slightly tilted each forming an angle of less than ninety degrees with the side walls of said tire body, a suitably shaped rubberized tape being provided on the radially inward surface of the lower portion of the tire body for engagement with a wheel rim and having a central portion which is concave with respect to the wheel rim and at least two substantially planar side tab elements which are slightly tilted to the horizontal when the tape is on a wheel rim.

12. A tubular tire for cycles comprising: a tire body having side walls and being formed by at least one band of rubberized fabric including reinforcement threads, the side edges of said band being longitudinally joined together to form a carcass or tubular element, a torroidal inner tube of an elastomeric material wholly and irremovably enclosed thereinto and adapted to provide an air tube for inflating the tire, and a tread disposed on the radial outer circumference of said tire body, the tubular tire being characterized in that the cross-section of said tubular tire is tunnel-shaped, the junction of the edges of the tire body being located radially external with respect to the tire body and under the tire tread, the lower portion of said tire body being shaped to form a central area which is concave with respect to a wheel rim and said lower portion having two side tabs that are substantially flat and slightly tilted each forming an angle of less than ninety degrees with the side walls of said tire body, a suitably shaped rubberized tape being provided on the radially inward surface of the lower portion of the tire body for engagement with a wheel rim, the thickness of the tire body concave portion being substantially equal to the thickness of the tire body lower portion side tabs.

* * * * *